United States Patent
Hindocha et al.

(10) Patent No.: US 10,587,598 B2
(45) Date of Patent: Mar. 10, 2020

(54) METHOD FOR PROVIDING INFORMATION FROM AN ELECTRONIC DEVICE TO A CENTRAL SERVER

(71) Applicant: Tokon Security AB, Solna (SE)

(72) Inventors: Neal Hindocha, Copenhagen (DK); Christopher Lindfeldt, Solna (SE)

(73) Assignee: Surfboard Payments AB, Uppsala (SE)

( * ) Notice: Subject to any disclaimer, the term of this patent is extended or adjusted under 35 U.S.C. 154(b) by 330 days.

(21) Appl. No.: 15/515,845

(22) PCT Filed: Sep. 30, 2015

(86) PCT No.: PCT/SE2015/051035
§ 371 (c)(1),
(2) Date: Mar. 30, 2017

(87) PCT Pub. No.: WO2016/053176
PCT Pub. Date: Apr. 7, 2016

(65) Prior Publication Data
US 2017/0302642 A1 Oct. 19, 2017

(30) Foreign Application Priority Data
Sep. 30, 2014 (SE) ...................................... 1451161

(51) Int. Cl.
*H04L 29/06* (2006.01)
*G06F 21/36* (2013.01)
(Continued)

(52) U.S. Cl.
CPC .............. *H04L 63/08* (2013.01); *G06F 21/36* (2013.01); *G06F 21/43* (2013.01); *H04B 1/3816* (2013.01);
(Continued)

(58) Field of Classification Search
CPC ...... H04L 63/08; H04L 63/102; H04W 12/06; H04W 12/00522; H04W 4/14;
(Continued)

(56) References Cited

U.S. PATENT DOCUMENTS 6,209,104 B1 * 3/2001 Jalili ....................... G06F 21/36
340/5.8
9,083,527 B1 * 7/2015 McCorkendale ... H04L 63/0421
(Continued)

FOREIGN PATENT DOCUMENTS

| EP | 1102157 A1 | 5/2001 | |
| WO | 01/80525 A1 | 10/2001 | |
| WO | WO-0180525 A1 * | 10/2001 | ............. G06F 21/43 |

OTHER PUBLICATIONS

Fawaz A. Alsulaiman and Abdulmotaleb El Saddik, "Three-Dimensional Password for More Secure Authentication", vol. 57, No. 9, p. 1929-1938, Sep. 2008; IEEE.
(Continued)

*Primary Examiner* — Theodore C Parsons
(74) *Attorney, Agent, or Firm* — Tucker Ellis LLP (57) ABSTRACT

Method for providing information to a central server (130, 150) using an electronic device (120,122) comprising a screen display (121,123) and a SIM card. The method comprises, first, registration steps comprising providing from the electronic device to the central server a code via an SMS message. The method further comprises, information provision steps comprising a) providing to the electronic device digitally coded image data; b) displaying on said screen display an image based on said image data to the user; c) allowing the user to select a specific part of the displayed image; d) providing to the central server a coordinate position representing the location for the specific part; e) in the central server, identifying one subpart of said displayed image, corresponding to the coordinate position; and f)
(Continued)

translating the subpart into a piece of information corresponding to the sub-part in question based upon a set of associations between specific respective such subparts and specific respective pieces of information. The invention also relates to a system (100) and a computer software product arranged to cooperate with such a system.

15 Claims, 4 Drawing Sheets

(51) Int. Cl.
| | | |
|---|---|---|
| *G06F 21/43* | (2013.01) | |
| *H04W 12/06* | (2009.01) | |
| *H04B 1/3816* | (2015.01) | |
| *H04W 4/14* | (2009.01) | |
| *H04W 12/00* | (2009.01) | |
| *G06F 3/0481* | (2013.01) | |
| *G06F 3/0484* | (2013.01) | |
| *G06F 3/0488* | (2013.01) | |

(52) U.S. Cl.
CPC .............. *H04L 63/102* (2013.01); *H04W 4/14* (2013.01); *H04W 12/06* (2013.01); *G06F 3/0488* (2013.01); *G06F 3/04815* (2013.01); *G06F 3/04842* (2013.01); *G06F 3/04845* (2013.01); *H04W 12/00522* (2019.01)

(58) Field of Classification Search
CPC ...... G06F 21/36; G06F 21/43; G06F 3/04815; G06F 3/04842; G06F 3/04845; G06F 3/0488; H04B 1/3816
See application file for complete search history.

(56) References Cited

U.S. PATENT DOCUMENTS

| | | |
|---|---|---|
| 2004/0073809 A1 | 4/2004 | Keong |
| 2006/0206919 A1* | 9/2006 | Montgomery .......... G06F 21/31 726/2 |
| 2008/0184363 A1 | 7/2008 | Narasimhan |
| 2011/0055548 A1* | 3/2011 | Varghese ................ G06F 21/36 713/150 |
| 2012/0005483 A1 | 1/2012 | Patvarczki |
| 2012/0027267 A1* | 2/2012 | Kim ...................... G06F 3/0418 382/118 |
| 2013/0097697 A1 | 4/2013 | Zhu et al. |
| 2013/0139239 A1 | 5/2013 | Jillings |
| 2013/0252585 A1* | 9/2013 | Moshir .................. G06F 21/35 455/411 |
| 2014/0090021 A1 | 3/2014 | Berkovitz et al. |
| 2015/0074414 A1* | 3/2015 | Kim ...................... H04L 9/3247 713/176 |
| 2015/0227025 A1* | 8/2015 | Park ....................... G03B 15/05 348/224.1 |

OTHER PUBLICATIONS

International Search Report and Written Opinion from corresponding International Application No. PCT/SE2015/051035, dated Jan. 19, 2016.

International Preliminary Report on Patentability from corresponding International Application No. PCT/SE2015/051035, dated Oct. 14, 2016.

* cited by examiner

METHOD FOR PROVIDING INFORMATION FROM AN ELECTRONIC DEVICE TO A CENTRAL SERVER

RELATED APPLICATION DATA

This application is a national phase application of International Application No. PCT/SE2015/051035 filed Sep. 30, 2015 and published in the English language, which claims priority to SE 1451161-2 filed Sep. 30, 2014, which are hereby incorporated herein by reference.

The present invention relates to a method for providing information from an electronic device to a central server, such as authentication-related information or other secret and/or sensitive and/or personal information, in a secure manner. In particular, the invention relates to a method for, in an initial step, registering a particular electronic device, arranged with a SIM (Subscriber Identity Module) card, for use with a central server, and to thereafter provide said information.

In many situations it is desirable to provide information from an electronic device, such as a personal computing device, a handheld communications unit such as a smartphone, or the like, to a central server, such as over the internet. For instance, when logging into various services, it is often necessary to provide login credentials such as user names, passwords, etc., via an electronic device used to access said service. In other cases, the use of a service provided by a central server requires user input as a part of the service in question, such as the provision of personal data into a personal workout tracking service. There are many more, similar examples of when information is requested by a central server from a user operating an electronic device which is in communication with the central server.

In case such information is secret for whatever reason, there are typically security problems relating to such information provision. For instance, a malware, such as a so called Trojan Horse, can be planted on the electronic device and used to scan for user input via an input control such as a software-implemented on-screen keyboard on a touch-screen smartphone, or a physical keyboard on a PC computer. Another threat is a man-in-the-middle attack in which a third person intercepts a data stream between the electronic device and the central server. In these and other cases, the information runs the risk of being captured and interpreted by a non-eligible third party, which is not desirable.

In order to solve this problem, conventionally encryption is typically used. However, even an encrypted signal is sensitive to attacks, especially keyboard monitoring-type attacks and software designed to scan the internal memory of a particular electronic device for information similar to PIN codes, passwords and the like.

Hence, there is a need for providing a secure way of communicating information from an electronic device to a central server.

Furthermore, in many applications in which a central server is arranged to communicate with a plurality of electronic devices, there is a risk of DoS (Denial of Service) attacks from malevolent third parties. In particular, flood or overload attacks constitute a problem for central servers arranged to respond to registration calls from new users.

The present invention solves these problems.

Hence, the invention relates to a method for providing information to a central server using an electronic device comprising a screen display and a SIM (Subscriber Identity Module) card, which method is characterised in that it comprises an initial registration step, in which a code is provided to the electronic device, the electronic device sends, in an SMS (Short Message Service), the said code or a value calculated based on said code to a predetermined SMS recipient, the central server receives said code or value comprised in said SMS and based thereupon authenticates the electronic device, and in that the method further comprises, in a later performed information provision step the sub steps a) providing to the electronic device digitally coded image data; b) displaying on said screen display an image based on said image data to the user; c) allowing the user to select a specific part of the displayed image; d) providing to the central server from the electronic device a coordinate position representing the location for the specific part on the screen display; e) in the central server, identifying one subpart of said displayed image, among a set of several different such subparts, corresponding to the coordinate position; and f) translating the subpart into a piece of information corresponding to the subpart in question based upon a set of associations between specific respective such subparts and specific respective pieces of information. Furthermore, the invention relates to a system for allowing a user to provide information using an electronic device comprising a screen display and a SIM (Subscriber Identity Module) card, which system comprises a central server, which system is characterised in that the central server is arranged to, in an initial registration step, receive an SMS (Short Message Service) message comprising a code or a value, and based thereupon, authenticate the electronic device, in that the system is arranged to, in a subsequent information provision step, provide to the electronic device digitally coded image data, or alternatively the system (100) is arranged with information regarding such digitally coded image data existing in the electronic device (120,122;400; 500), based on which digitally coded image data the electronic device can display, on said screen display, an image comprising a set of at least one image subpart which in the central server is associated with a particular piece of information, in that the system is arranged to receive, from the electronic device, a coordinate position representing the location on the screen display for a user-selected specific part of the displayed image, in that the central server is arranged to, as a reaction to the reception of said coordinate position, identify one of said set of subparts of said displayed image, corresponding to the received coordinate position, and in that the system is arranged to then translate the identified subpart into a piece of information corresponding to the subpart in question based upon a set of associations between specific respective such subparts and specific respective pieces of information.

Also, the present invention relates to a computer software product arranged to, when executed on or from an electronic device comprising a screen display and a SIM (Subscriber Identity Module) card is arranged to provide an interactive graphical user interface to a user of the device, which computer software product is characterised in that the software product is arranged to, in an initial registration step, receive a code and, in an SMS (Short Message Service), send the said code or a value calculated based on said code to a predetermined SMS recipient, in that the software product is furthermore arranged, in a subsequent information provision step, with, or to receive from a central server, digitally coded image data based upon which an image can be displayed to the user on said screen display, and, in reaction to the receipt of such image data, display said image and to allow the user to select a specific part of the displayed image, and then to provide to the central server a coordinate position representing the location for the specific part on the screen display.

In the following, the invention will be described in detail, with reference to exemplifying embodiments of the invention and to the enclosed drawings, in which.

Figure 1:
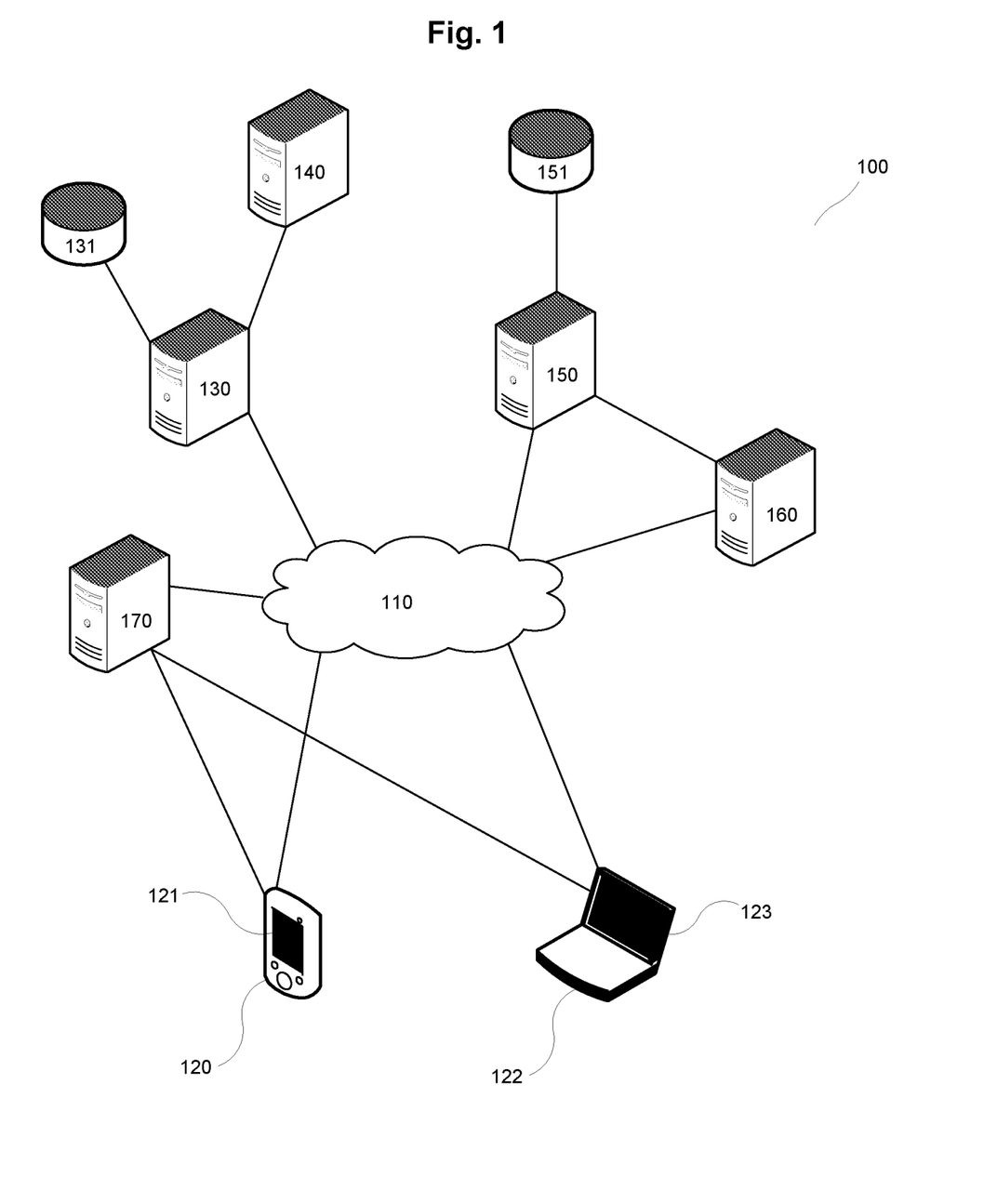
FIG. 1 is an overview diagram of a system arranged to perform a method according to the present invention.

Hence, FIG. 1 illustrates a system 100 for performing a method according to the present invention. In particular, the system 100 comprises component parts for performing several different such methods according to the invention.

Two different electronic devices 120, 122 are each connected to the internet 110, preferably but not necessarily via a wireless connection such as WiFi, GPRS, LTE or the like. The electronic device 120 is in the form of a handheld, portable device such as a mobile phone, for instance a so-called smartphone. The device 122 is in the form of a personal computer, such as a PC, which is also preferably portable. Both devices 120, 122 feature a respective screen display 121, 123 capable of showing raster images defined by pixel sets of certain color and/or light intensity. It is realized that the electronic devices 120, 122 merely constitute examples of electronic devices suitable for use with the present method. For instance, a stationary computer with a separate screen may also be used, having a wired internet connection.

Both devices 120, 122 comprise a respective SIM (Subscriber Identity Module) card, and are hence arranged to send, and preferably also to receive SMS (Short Message Service) messages via a conventional mobile telephony network (not shown).

Furthermore, a first 130 and a second 150 central server according to the invention are also connected to the internet 110, and thereby to devices 120, 122. The first central server 130 is connected to or comprises a first database 131. The second central server 150 is connected to or comprises a second database 151.

A first requesting (or responding, depending on the embodiment of the invention) server 140 is connected to, and arranged to communicate with, the first central server 130. Specifically, the server 140 is a web server, and the server 130 is arranged to act as an intermediary between the web server 140 and either device 120, 122.

Similarly, a second requesting server 160 is connected to, and arranged to communicate with, the second central server 150. Specifically, the server 160 is arranged to request the server 150 to in turn request information from a user of either device 120, 122. Moreover, the server 160 is preferably also connected to the internet 110.

It is realized that the two central servers 130, 150 shown constitute two different examples of embodiments of servers according to the present invention, and need not co-exist in the system 100.

An SMS recipient 170, which may be conventional as such, and which is arranged to receive and preferably also send SMS messages over a conventional mobile telephony network, is in contact with the devices 120, 122 as well as with servers 130, 150 via internet 110. It is realized that server 170 may be a part of either server 150 or 130.

Servers 130, 140, 150, 160, 170 can be standalone or distributed servers, physical or virtual servers, or any other conventional type of serving functionality arranged to provide digital services to clients via some type of digital interface. The corresponding is true regarding databases 131, 151.

Figure 2:
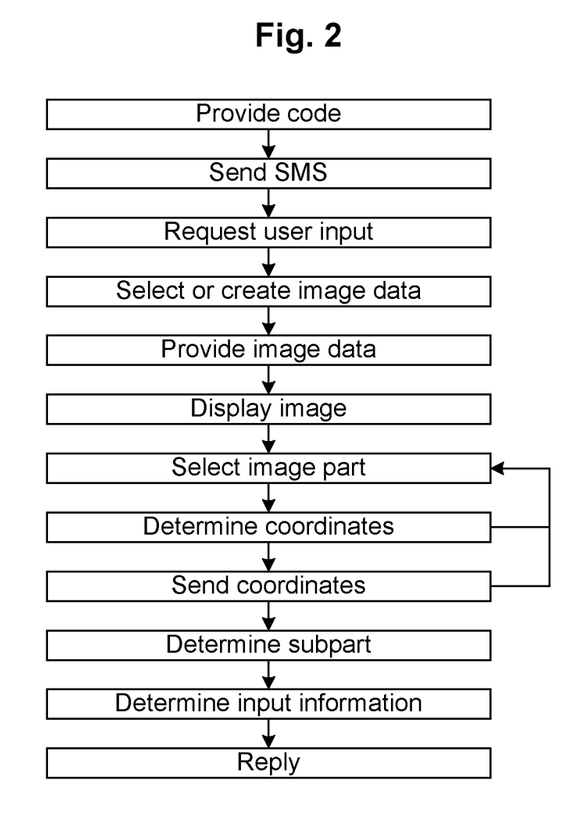
FIG. 2 is a flow chart of a first embodiment of the method according to the invention.

FIG. 2 illustrates a method according to a first preferred embodiment of the invention for providing information to the central server 150 using an electronic device 120, 122 comprising a screen display 121, 123.

In this first embodiment, the requesting server 160 is preferably in communication with the device 120, 122 before the method commences. For instance, the server 160 may provide a service to a user of the device 120, 122 such as an online banking service or any other conventional online service which is performed or delivered over the internet 110.

Then, in an initial registration step, a code is provided to the device 120, 122. The code is preferably provided from the central server 150, such as via an SMS message sent via server 170 on behalf of server 150; via a web page viewed on the device 120, 122 or another device; via surface mail; or in any other suitable way.

Preferably, the code is a 4-digit PIN code or a more complex alphanumerical code. The device 120, 122 is arranged to, preferably by the below described software function, to first receive the code. This can take place, for instance, by the user manually entering the code using a graphical user interface provided by the below described software function, or by the software function being arranged to automatically receive the code which is sent to the device 120, 122 in the form of an digital message, such as a web call, an e-mail or, preferably, an SMS message sent from the server 150 via server 170.

Then, in a second step of the initiation procedure, the device is arranged to send an SMS message to the central server 150, such as via server 170, which message comprises the code, or a value calculated based upon the code, such as a hash of the code. Preferably, the SMS message comprises or is constituted by an encrypted version of the code, in a format which is readable and understandable by the central server 150. Examples comprise using public key infrastructure encryption or the like, and can be conventional as such.

Finally, based upon the code, which is made known to the server by the server reading the said SMS and making any required calculations in a way which has previously been agreed upon, the central server 150 is arranged to authenticate the electronic device 120, 122. This authentication preferably comprises or results in that a secure communications channel, such as a VPN (Virtual Private Network) or any encrypted channel, is set up between the device 120, 122 and the server 150. For instance, the code may be a password to initiate a process to perform a TLS-SRP (Transport Layer Security Secure Remote Password) procedure resulting in a TLS-SRP tunnel, using which further subsequent communication between the central server 150 and the device 120, 122 is performed. The secure channel may be initiated immediately or later, when the need for information provision from the device 120, 122 to the server 150 arises.

As an alternative, a first code may be provided to the mobile device 120, 122, and communicated to the central server 150 via an SMS in the above described way. Then, the central server 150 may send an SMS back to the device 120, 122, preferably via server 170, comprising a second code, for instance in the form of a password to initiate a secure channel according to the above.

The device 120, 122 may be arranged, preferably via said software function, to use a native SMS application which is then preferably controlled by the software function to automatically construct and send the SMS message with the specified content, comprising said code or value, preferably without any active participation by the user of the device 120, 122.

After the receipt and processing by the central server 150 of the information contained in the SMS, the device 120, 122 is registered for use with the central server 150.

At a later point in time, in a third step of FIG. 2, there may be a need for the user to provide information to the server 160, which information is sensitive in some respect. For instance, such information may be personal information; login credentials; credit card information; or any other information that the user and/or the operator of the server 160 wants to keep secret. Then, the requesting server 160 sends a request to the central server 150 to in turn request the user to input, via the device 120, 122, which is then registered with the server 150 according to the above, the needed information. In the request, it is preferably specified the type and format of the information needed. For instance, the requested information may be a 4-digit PIN code; an address; or a selection between a number of different entities presented to the user via direct access to the requesting server 160 but where the choice is made via server 150 using an image depicting the different choices as described in the following.

In general, it is preferred that the requested information is authentication information entered by a user via the electronic device 120, 122.

In a fourth step, digitally coded image data is either selected or created by the server 150 and, in a fifth step, provided to the electronic device 120, 122. According to a preferred embodiment, the digitally coded image data is provided at least partly by the database 151. The type of image data used is matched to the type of information needed for the user to input. For instance, if the user is to enter a numerical PIN code, an image comprising depictions of the numbers 0-9 can preferably be used, or an image comprising ten differently colored fields, where each color represents a certain number as defined by a key available to the user.

Herein, the term "digitally coded image data" encompasses digitally stored information defining the appearance of an image. Examples of such data comprise a raster image comprising a number of pixels of varying color and/or light intensity, which raster image can be scaled or cropped to fit a specific viewing panel of a specified pixel size; scalable vector graphics; a set of graphical objects with respective positioning information for displaying on a certain viewing panel of a specified pixel size; and a set of rules for constructing an image on a pixel screen in a well-defined way. What is important is that it is possible to construct an image based upon the digitally coded image data in a way so that the constructed image comprises at least one subpart (see below) the position and extension of which on the screen display is well-defined and unambiguous, possibly after a manipulation step of the displayed image (see below), which manipulation step itself can be described by a set of parameters.

Hence, according to a preferred embodiment, the digitally coded image data is communicated from the central server 150, which preferably also constructs said image data, to the device 120, 122. However, according to an alternative embodiment, the electronic device 120, 122 is either provided with the digitally coded image data in an initial step, which may be performed beforehand, either from the central server 150 or from any other source, or the device 120, 122 may create the digitally coded image data itself. This may be performed as a part of the above described initiation step, after the said secure channel has been set up. In case the digitally coded image data is not communicated from the central server 150 to the device 120, 122, the device 120, 122 sends to the central server 150 the said image data, or at least information based upon which the central server 150 can interpret the screen coordinates for the selection of a user on the screen 121, 123.

For instance, the device 120, 122 may be provided, in said initial step, with a number of different images, such as at least 100 different images, from the central server 150. Then, the central server, or the device 120, 122, can determine, such as randomly, which image to use for a particular input. If it is the device 120, 122 that selects the image, an image identifier is communicated to the central server 150 so that a subsequent user input can be interpreted by the central server 150. In another example, the user 110 may select an image from an available set of images before making the input.

In a sixth step, an image based upon the said digitally coded image data is displayed on the screen display 121, 123 of the device 120, 122 to the user.

The image displayed in the sixth step is preferably a pixel image, preferably displayed in a two-dimensional viewing panel on the screen display 121, 123, which viewing panel has a certain extension on the screen display 121, 123 which is preferably predetermined either by the device 120, 122 but preferably by the server 150.

That the image is "based upon" the above described digitally stored image data means that the image displayed on the screen display 121, 123 is either a copy of the digitally stored image data; a scaled, rotated or cropped version of the digitally stored image data; calculated or determined based upon the digitally stored image data; or produced in any other suitable way producing an image comprising at least one subpart the position and extension of which on the screen display is well-defined and unambiguous given the digitally stored image data upon which the determination of the displayed image is based, and possibly after a parameter-based manipulation step of the displayed image.

Hence, the central server 150 provides data to the device 120, 122 making it possible to display a pixel image on the screen display 121, 123 in a way so that the pixel image comprises at least one image subpart the position of which, in terms of display pixels, is possible to determine in a well-defined way by the central server 150 given the digitally stored image data and any parameter values relating to any manipulation of the displayed pixel image.

In one preferred embodiment, the screen display 121, 123 is divided into a grid by the central server 150, so that each pixel which is selectable on the screen display 121, 123 corresponds to a certain position in the grid, and so that each grid location corresponds to a certain image subpart. With a grid where each grid location is, for instance, a square of 16×16 pixels on the screen display, one specific subpart can comprise one or several grid locations, which in turn comprises 256 different pixels each. It is preferred that the central server 150, as a part of the request provided from the server 160 in the third step, is provided a desired grid size as defined by a desired number of grid X and Y positions to use. Thereafter, the central server 150 is arranged to automatically distribute the available pixels of the screen display 121, 123 (which is known to the central server 150) into such a grid with equidistant X- and Y locations. This is a particularly simple solution, which also works in the same way on different electronic devices 120, 122, with differently sized screen displays 121, 123, in a way which is transparent to the requesting server 160.

Then, in a seventh step, the user of the device 120, 122 is allowed to select a specific part of the displayed image. Preferably, an interactive graphical user interface based on software executed on or by (such as in the form of a locally installed software application or a remotely accessed software function such as via HTML5) the electronic device is arranged to allow the user to select said specific part of the image. The selection preferably takes place by the user selecting a specific point on the display 121, 123, such as by the display 121, 123 being a touchscreen or using a conventional computer mouse connected to the device 120, 122.

The interactive graphical user interface function discussed in various context herein is in general arranged to communicate with the central server 130, 150 over predetermined digital interfaces.

In an eighth step, the device 120, 122 determines coordinates, on the screen display 121, 123, specifying the location of the selected specific part of the image. Preferably, the specific part is a point or an area, preferably a point, the location of which is identified using at least a pair of pixel coordinates of the screen display. Such pixel coordinates are preferably device 120, 122 specific, in other words dependent of the hardware configuration of the device 120, 122 in the sense that they correspond to the actual pixel coordinates on the physical screen display 121, 123 of the specific part selected by the user, rather than, for instance, coordinates in a coordinate system relating to the size of the image and not to the number of physical pixels in any direction of the actual physical screen display 121, 123.

It is preferred that the user is provided a visible and/or audible and/or tactile feedback for each validly detected selection of a specific part of the image.

In a ninth step, the said coordinates are provided to the central server 150 from the electronic device 120, 122. In other words, information is provided to the central server 150 specifying an on-screen coordinate position representing the location for the specific part on the screen display 121, 123, which specific part was selected by the user in the seventh step. This provision to the central server 150 may take place over any channel, such as in the form of an SMS message as described above for the said code or value. However, it is preferred that the provision takes place via the internet 110, such as using a conventional web call, to transfer the coordinate information. In the latter case, it is furthermore preferred that the central server 150 does not accept such communications from non-registered devices, but only from devices 120, 122 that have been initiated according to the above described.

It is preferred that one single piece of software, run on or from the device 120, 122 is arranged to perform all the above steps performed by the device 120, 122, and also to take care of all communication with the central server 130, 150. It is also preferred that this piece of software is arranged to provide an interactive graphical user interface which is arranged to provide all the device 120, 122 functionality described herein in terms of user interaction with the device 120, 122.

Using the information provided to the central server 150 in the ninth step, the central server 150 can then, in a tenth step, identify one subpart of said displayed image, among a set of several different such subparts, corresponding to the coordinate position. Possibly, additional information, such as parameter values describing a manipulation of the displayed image or the shape of a three-dimensional object onto a surface of which the image has been painted (see below), is also required to identify the subpart. However, the coordinate information, possibly in combination with said additional information, is enough for the central server 150 to be able to determine which one of said set of several subparts that corresponds to the specific part of the displayed image that the user selected in the seventh step, in an unambiguous manner. This is because the central server 150 has knowledge of the digital image data used and the below discussed associations between the subparts and particular pieces of input information.

In an eleventh step, the identified subpart is hence translated, by the central server 150, into a particular piece of information corresponding to the subpart in question. This piece of information can be, for instance, an alphanumerical character corresponding to the piece of the image selected by the user in the seventh step.

According to the invention, this translation is performed based upon a set of associations between specific respective such subparts of the displayed image and specific respective particular pieces of information. For instance, a subpart in the form of an image area displaying the character "A", as raster graphics on the screen display 121, 123, can be associated with the logical character "A". It is preferred that the set of associations is stored in the database 151. In the example where the user is to choose between five entities, they may be represented in the displayed image by the numbers "1" through "5", by five different colors, symbols or the like, and the corresponding subparts can be associated with a respective association to the respective entity.

Several pieces of information can be provided by the user by reiterating to the seventh step, for instance by allowing the user to select several specific parts, determining the on-screen coordinates for each selected specific part and then sending a bundle of coordinate data to the central server 150, or by sending one set of coordinate data for one specific part in connection to the user selecting each specific part in question. Hence, the seventh, eighth, ninth and tenth steps are performed several times, so that a series of pieces of information is provided from the electronic device 120, 122 to the central server 150. Then, it is this series of particular information pieces that constitutes the sensitive information which is provided by the user and forwarded to the requesting server 160.

Finally, in a twelveth step, the central server 150 replies to the requesting server 160 with the requested information.

Using such a method and such a system 100, the user can be presented, in a safe way which also is difficult to hamper using DoS attacks, with a means to input information, via the electronic device 120, 122, for forwarding to the central server 150 and then on to the requesting server 160, in a secure way. Namely, since the only information communicated between the central server 150 and the electronic device 120, 122 is the image (downloaded to device 120, 122) and coordinate data (uploaded from device 120, 122), a third party will not be able to perform a man-in-the-middle attack without knowledge or manual analysis of the image being used. Moreover, a piece of malware installed on the electronic device 120, 122 will not be able to intercept the information input by the user by monitoring the interface activity of the device 120, 122, since the only information available to such malware is selection coordinates in an image, the contents of which are unknown per se to the malware. Therefore, it is very difficult for a non-legitimate third party to capture and interpret the information input by the user and transferred to the central server 150.

The communication between the central server 150 and the requesting server 160 may be, and preferably is, high security and encrypted. For even higher security, the requesting server 160 may even implement the central server 150 functionality as an internal software function.

Figure 3:
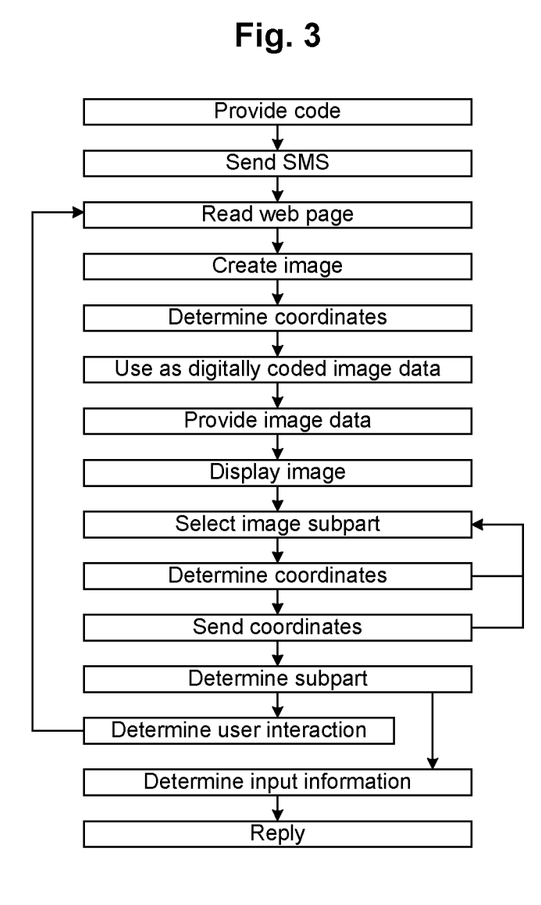
FIG. 3 is a flow chart of a second embodiment of the method according to the invention.
Figure 4:
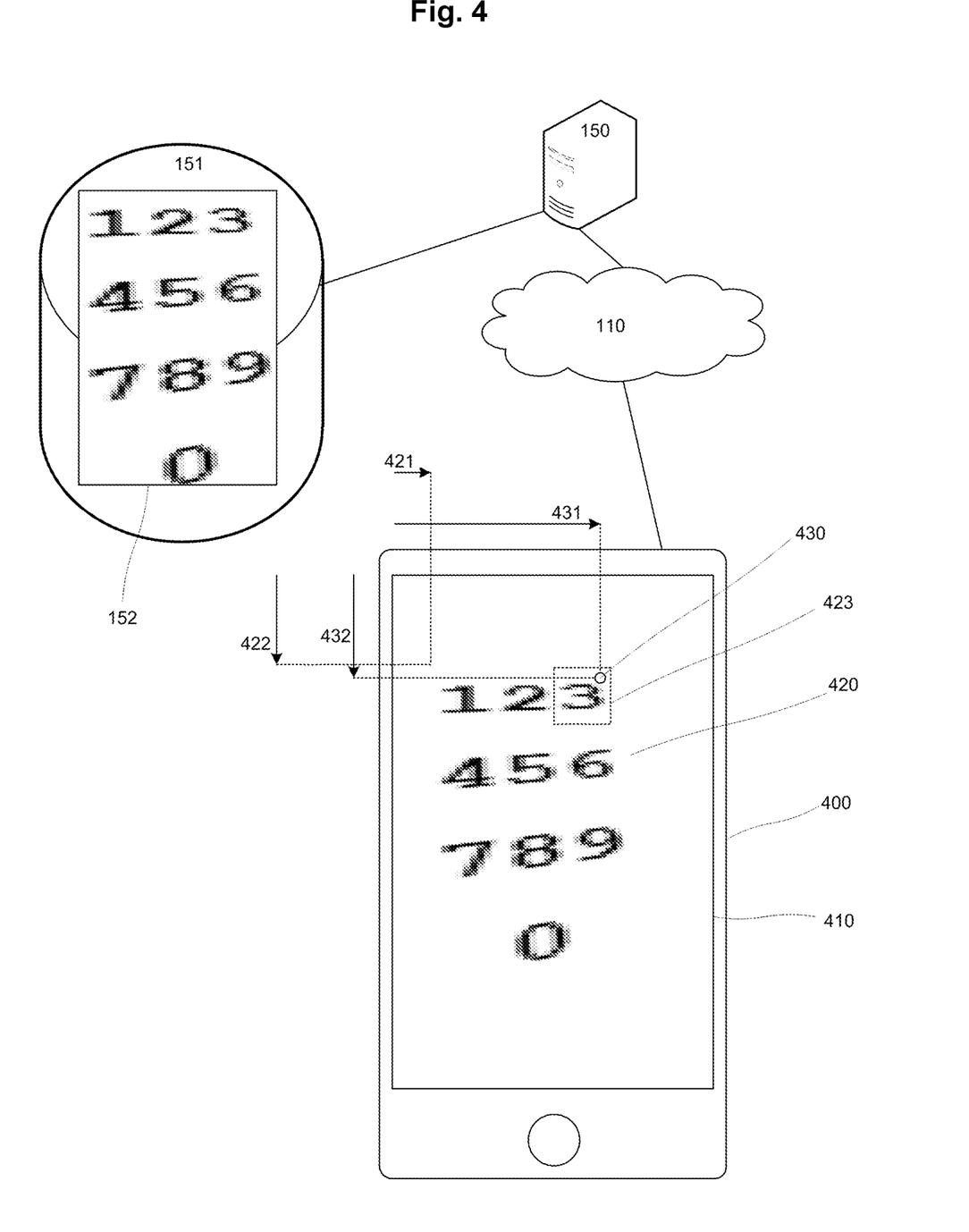
FIG. 4 is a view of a smartphone displaying an image depicting the numbers 0-9.

FIG. 4 shares reference numbers with FIG. 3 for like parts, and the device 400 corresponds to devices 120, 122. The database 151 comprises a piece of digitally coded image data, in the sense discussed above in connection to the fourth step of FIG. 2, in the form of a raster image file 152, such as a JPG or BMP file. The digitally coded image data also comprises instructions as to where on a screen display 410 of an electronic device 400 to display the image 420, in the exemplifying case at a position (421,422) from the upper left corner of the display 410. It is realized that the digitally coded image data may comprise any unambiguously defined image transformation, such as a translation, rotation, cropping, stretching, skewing, blurrying, color transformation and so forth.

In FIG. 4, the displayed image, in the sense of the sixth step of FIG. 2, is the image 420, displayed at (421,422) on the screen display 410. 430 denotes a part of the image, in the sense discussed above in the seventh step of FIG. 2, which is selected by the user. In the case of the device 400, having a touchscreen 410, the selection is by touching the point 430 using the user's finger, thereby pointing to a specific point on the display 410. In the eighth step of FIG. 2, it is the coordinates (431,432) of the selected point 430 that are determined and sent to the central server 150. Preferably, the coordinates (431,432) are the absolute pixel coordinates in relation to the screen display 410 of the device 400, and not in relation to the image 420.

423, on the other hand, denotes an area of pixel coordinates that is associated with a certain image subpart, in the sense of the tenth step of FIG. 2. The subpart 423 may comprise several grid locations. Hence, the central server 150 determines that the selected part 430 belongs to the group of pixel locations associated with the subpart 423. Since these pixels show a visual representation of the number "3", the input information, in the sense of the eleventh step of FIG. 2, is the logical number "3", by previous association in the central server 151. As a result, the translation in said eleventh step produces that the user selected the number "3".

The other displayed digits in the image 420 (0-2; 4-9) are each associated with a separate image subpart, in the form of a possible set of respective grid locations and a respective set of pixels, as well as a respective piece of input information (the respective logical number visually represented by the respective image 420 location). It is preferred that the displayed image 420 comprises a set of subparts, and that each such subpart in this set corresponds to a respective particular piece of information, preferably a different such particular piece of information.

It is furthermore preferred that no information regarding what image subpart 423 corresponds to what particular piece of information ("3") is provided to the electronic device 400. Hence, the device 400 has no access to the association information using which the central server 150 performs the translation in the eleventh step of FIG. 2.

Even though it would be possible for the digitally coded image data to be provided from another source, such as being preinstalled in the device 120, 122, 400 or being supplied from an external server (not shown in the figures), as long as the central server 150 gains knowledge about the appropriate associations between specific image parts and respective pieces of information, it is preferred that the digitally coded image data is provided from the central server 150 to the electronic device 120, 122, 400.

In this preferred case it is furthermore preferred that the digitally coded image data is generated by the central server 150, or selected by the central server 150 from a plurality of available pieces of digitally coded image data, so that the digitally coded image data is not the same every time that the method is performed. Preferably, a random piece or set of digitally coded data is selected each time the method is performed.

As described above, the image 420 illustrated in FIG. 4 is displayed at the specified location (421,422) on the screen 410. The coordinate information (421,422) is stored in the database 151 and used by the central server 150 when determining what image subpart 423 has been selected by the user selecting the part or point 430. In general, it is preferred that the image 420 is displayed so that its extension across the screen display 410 is defined by a specific set of pixel coordinate information, which coordinate information is used by the central server 150 in the above described translating in the eleventh step of FIG. 2. Hence, such pixel coordinate information may, for instance, specify a rectangular surface across the screen display 410 and that the image 420 is stretched to exactly fit this rectangular surface. Then, other information may be displayed in areas of the screen 410 which are not covered by the image 420. For instance, this can be used when the image is used as an input field which is a subpart of an interactive form or the like, such as when using the method for a web page application like the one described below in connection to the method steps of FIG. 3.

In one specific preferred embodiment, the image 420 is displayed to cover the entire surface of the screen display 410, apart possibly for a portion of the screen display 410 which is used for a "cancel" user control function (see below).

In this case, and also when the image 420 is not displayed across the entire surface of the screen display 410, it is preferred that the database 151 keeps a list of the maximum screen display size (in pixels) for various types of electronic devices that can be used with the system 100 and the present methods. This makes it easy for the central server 150 to interpret the pixel coordinate values provided by each electronic device to the server 150, and also to determine where on each screen display the image is to be displayed for each device and each run of the method. For instance, according to a preferred embodiment, the location (421,422) is preferably randomly assigned by the central server 150 as a part of the said digitally stored image data, so that the image is displayed at different locations on a particular screen display each time the method is run. The information regarding the screen display size can be automatically associated with a particular electronic device based upon knowledge in the database 151 or server 150 of pixel size for the type of device in question, or after manual provision by the user in an initial initiation step, such as the one described above.

In FIG. 4, the image 420 is displayed as a two-dimensional image on the two-dimensional screen display 410.

Figure 5:
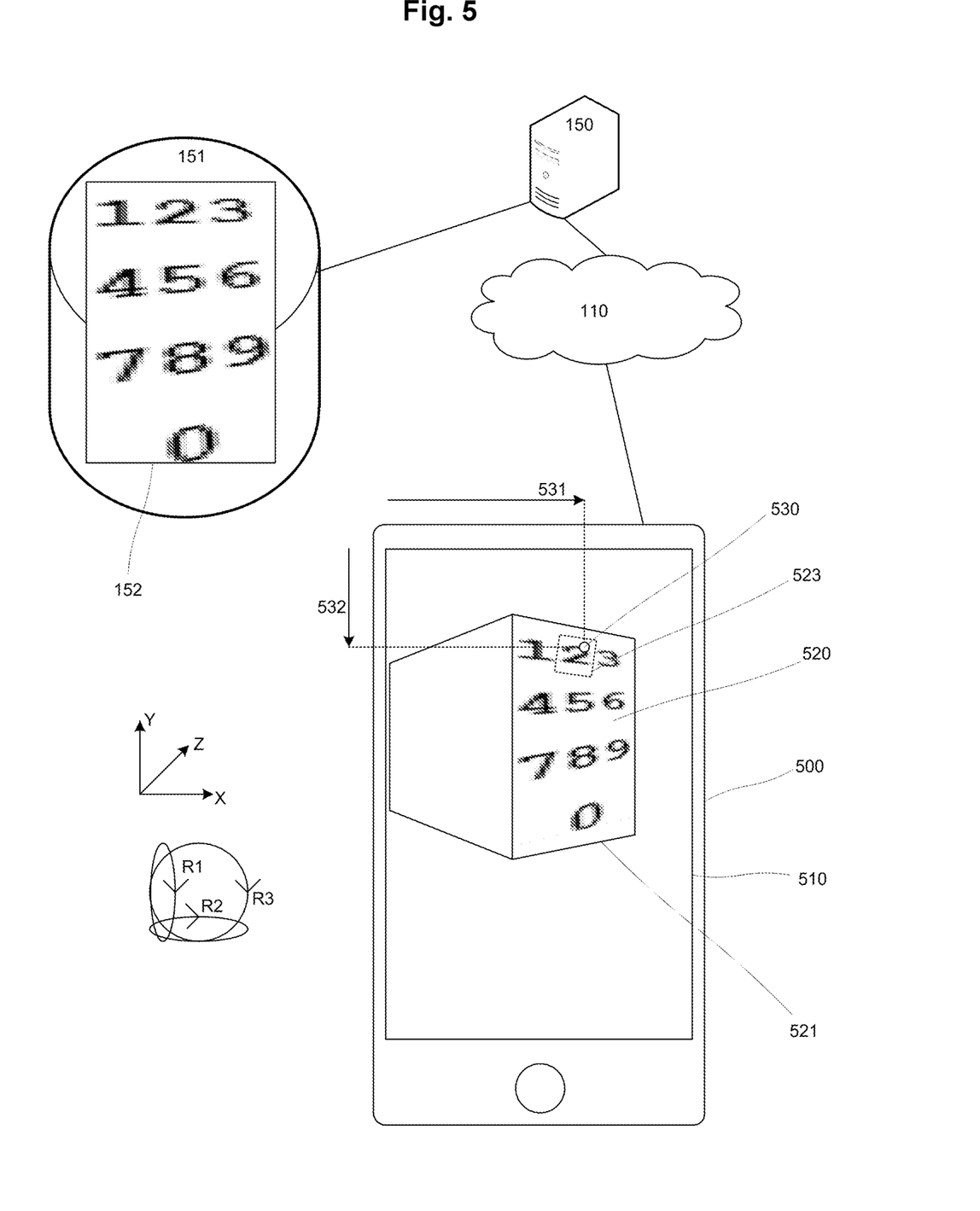
FIG. 5 is a view of a smartphone displaying an image on a rendered three-dimensional object.

In contrast thereto, in FIG. 5, which illustrates another preferred embodiment of the present invention and which also shares reference numerals with FIG. 1, the image 520 is displayed as a two-dimensional image surface in a three-dimensional structure 521, a projection of which three-dimensional structure 521 is shown on the screen display 510 of the electronic device 500. In the example shown in FIG. 5, the structure 521 is a cube which can be rotated along three axes of rotation R1, R2, R3 and translated along three linear directions X, Y, Z. An interactive graphical user interface software function according to the invention allows the user to preferably at least rotate the structure 521 in at least one rotational direction R1, R2, R3, preferably all three rotational directions R1, R2, R3, and preferably also to translate the structure 521 along at least one direction X, Y, Z, preferably in all three directions X, Y, Z. Such rotation and translation may, for instance, take place by the user swiping a finger across the touchscreen 510 in suitable patterns. As the variables R1, R2, R3, X, Y, Z are altered, the projection of the cube 521 updates on the screen 510. The image 520 is painted on one of the sides of the cube 521. Hence, the user can modify the location of the image 520 on the two-dimensional screen 510 by rotating and/or translating the three-dimensional structure 521. The 3D structure can be any suitable 3D structure, and one or several identical or different images 520 may be painted on surfaces of such 3D structure in any way, as long as the values of the modifiable parameters R1, R2, R3, X, Y, Z are communicated to the central server 150 together with the coordinates (531,532) of the part 530 on the screen display 510 selected by the user, and as long as the central server 150 can calculate, in an unambiguous way, what part, if any, of the image 520 to which the selected part 530 pertains. In FIG. 5, the selected part 530, at the current rotation and translation of the structure 521, pertains to an image subpart 523 associated with the number "2" in the database 151.

In general, as a part of the step in which the user is allowed to select a specific part or point 530 on the display 510, an interactive graphical user interface according to the invention executed on or from the electronic device 500 is arranged to allow the user to make said selection of the specific part 530. Then, the same user interface is further arranged to allow the user to manipulate the three-dimensional structure 521 so as to modify the position on the screen display 510 of the image 520 before selecting said specific part. Also, in the step in which the coordinate (531,532) information is provided to the central server 150, information regarding the said manipulations are also provided to the central server 150, together with the coordinate data.

This way, for instance different character sets can be depicted on different surfaces of a suitable 3D structure; or the user can be encouraged to enter a PIN on the side of a cube which has certain background color. By such methods, the added security is achieved that an intercepting third party will also need knowledge about the nature and state of the structure 521 in order to be able to interpret the user selections in order to be able to in turn decode the information sent to the central server 150 and further to the requesting server 160.

According to another preferred embodiment, which may for instance be used with either the displaying approach illustrated in FIG. 4 or the one illustrated in FIG. 5, the displayed image 420, 520 is variable, such as over time or in accordance with a progress parameter the value of which the user is allowed to influence using the said interactive graphical user interface software function.

In a first example of this, the said user interface software function is arranged to automatically change the image 420, 520 over time. For instance, the image 420 can be moved around the display 410 by continuously incrementing or modifying the coordinates (421,422); the structure 521 can be continuously stretched, skewed or rotated in the R2 direction; or the image can be altered in any other way, preferably so that the location of at least one subpart 423, 523 is also altered as a consequence. Then, the point in time when the user selects the specific image part will affect what subpart is selected and hence the contents of the sensitive information communicated to the servers 150, 160. In order for the central server 150 to be able to interpret the information, the time value itself can be sent from the device 400, 500 to the central server 150, or the updated coordinates (421,422), (R1), etc. can be sent as a part of the coordinate (431,432), (531,532) selection information.

In a second example, the graphical user interface executing on or from the electronic device 400, 500 is arranged to allow the user to set the value of a progress parameter to a specific value before selecting the specific part of the image. The progress parameter can, for instance, be set by a slider control in the said interactive graphical user interface and can, for instance, control how long the image 420 or the structure 521 has travelled along a predetermined, possibly curvilinear path which is preferably known to the central server 150. In this case, it is preferred that the value of the progress parameter at the time for the user selecting the specific part is provided to the central server 150 together with the coordinate data (431,432), (531,532).

This will add an additional layer of security to the information provision. FIG. 3 illustrates the method steps of an additional preferred embodiment of the present invention, in which the servers 130, 140 are used.

The method illustrated in FIG. 3 comprises the initial two steps of providing a code to the device 120, 122, such as from the central server 130, and to cause the device 120, 122 to send an SMS to the server 130 comprising the code or a value calculated based upon the code. These steps aim at initiating or registering the device 120, 122 with the server 130, as well as to achieve a secure communications channel between server 130 and device 120, 122 as has been described in detail above. These two initial steps correspond to the two initial steps illustrated in FIG. 2, and all that has been said above in relation to these steps in FIG. 2 is applicable to the first two steps in FIG. 3 as well.

From after the performance of these two steps and onwards, the central server 130 and the device 120, 122 hence have access to such a secure channel for performing their communications as described in the following.

However, the method illustrated in FIG. 3 differs from the method illustrated in FIG. 2 in what happens at a later point in time, and more precisely in the method steps performed before and in connection to the provision of digitally coded image data to the electronic device 120, 122.

More precisely, the method illustrated in FIG. 3 comprises, at said later point in time, a third step of reading a web page, from the web server 140. Alternatively, this step may comprise constructing a displayable web page in the central server 130, for instance based upon instructions provided by a server such as web server 140. What is important is that the central server 130 has access to a web page which is to be viewed by the electronic device 120, 122, or at least the part of such a web page which is to be visible on its screen display 121, 123.

It is particularly preferred that the server 130 acts as an intermediary between the device 120, 122 and the web server 140, in the sense that the device 120, 122, when accessing a particular web page provided by the web server 140, automatically is redirected to server 130 which in turn reads the web page in question from web server 140 and feeds the read web page in the form of an image file (such as a JPG or BMP raster image) to the electronic device 120, 122. This way, the device 120, 122 can view the same web page but in the form of an image delivered from server 130 as an intermediary, rather than a web page, in HTML format or another markup language, directly from server 140.

Hence, in a third step in FIG. 3, a web page, the HTTP address of which is for instance requested by electronic device 120, 122, the web server 140 itself or another server using the services of web server 140 as a part of a web page provided by the other server, is read or constructed.

In a fourth step, a digitally coded raster pixel image of the web page is constructed. Preferably, the constructed image is essentially a pixel-by-pixel copy of the web page as it would be presented when viewed in a conventional web reader, but formatted as an image file.

In a fifth step, coordinate positions and extensions are determined for at least one, preferably several, image subparts of said pixel image, which subparts correspond to specific parts of the web page in question. These image subparts correspond to the image subparts discussed above in connection to FIG. 2, and are hence parts of the web page which the user can select or interact with in order to provide the sensitive data input in question to the central server 130. It is preferred that the central server 130 is arranged to perform this determination automatically, based upon an analysis of the HTML specifying the web page layout.

In a sixth step, the image file is caused to constitute the whole, or at least part of, the digitally stored image data which, in a seventh step is then provided to the electronic device 120, 122. This digitally stored image data corresponds to the digitally stored data described above in connection to the fifth step of FIG. 2.

Then, in steps eight through twelve, the image is displayed on the screen display 121, 123 of the device 120, 122, and the user is allowed to select one or several specific parts of the image corresponding to areas determined as subparts in the fifth step. The coordinates of such selections are sent to the central server 130, which determines corresponding selected subparts. These steps eight to twelve correspond to steps six to nine in FIG. 2. As seen in FIG. 3, the user can be allowed to select several subparts by iterating back to the ninth step, as described above in connection to FIG. 2.

However, according to a preferred embodiment, the web page in question is an interactive web page, as opposed to a static web page. Herein, an "interactive" web page is meant to encompass web pages that modify their appearance in response to user input or interaction, such as by user controls. Then, the electronic device 120, 122 is arranged to detect user interaction events when displaying the image, and to provide information regarding such events to the central server 130. This functionality is preferably built into the above discussed interactive graphical user interface software, which is also preferably arranged to display the image on the device 120, 122. In reaction to the provision to the central server 130 of information regarding such events, the central server 130 reiterates the third to seventh steps, so that an updated web page (after said user interaction) is provided to, and displayed on, the electronic device 120, 122.

In general, it is in this case sufficient for the central server 130 to receive from the device 120, 122 information detailing the physical coordinates at which the user interaction (such as a mouse click, a touchscreen finger press, a cursor focus shift or the input of a character) occurred, and the type of interaction, in order to properly be able to forward the user interaction event to the web server 140 and, as a response to the user interaction in question, receive in return an update web page layout.

Hence, in an thirteenth step, the graphical user interface software function running on or from the device 120, 122 detects and determines the particulars regarding a user interaction event, which is fed back to the central server 130, which in turn starts over from the third step, using the updated information.

Then, in a fourteenth step, the central server 130 determines the input information and, in a fifteenth step, replies to the web server 140 with the determined information. These steps hence correspond to the eleventh and twelveth steps of FIG. 2. The user interaction is not necessarily directly related to the sensitive information provided by the user from the electronic device 120, 122. Instead the interaction may be important from a user experience perspective. However, the interactivity may also be the channel for actually providing the sensitive information, by for instance setting various user controls to certain values in the web page. In the latter case, the thirteenth step of FIG. 3 may be performed directly by the web server 140, in which case the fourteenth step is not necessary.

This way, a user may be provided a "normal" user experience when visiting a web page, including user interactions that are expected to generate certain interactive events on the part of the web server 140 providing the web page, and to be able to input sensitive information via such a web page, but at the same time limiting the access to the sensitive information for non-eligible third parties to at best selection coordinates in an image which per se is not easily machine interpretable.

As mentioned above, the invention relates to a method for providing sensitive information from a user to a central server 130, 150, via an electronic device 120, 122, 400, 500. Furthermore, the invention relates to a system 100 and a computer software product, which system and software product are arranged to cooperate in the performance of a method according to the invention. As such, the system 100 in one aspect comprises the electronic devices 120, 122, 400, 500 themselves, and in another aspect, which is particularly useful when cooperating with a plurality of different electronic devices 120, 122, 400, 500 each running their own software product according to the invention, does not comprise the electronic devices 120, 122, 400, 500 as such. In particular, in the latter case, the system 100 may be completely contained in a respective central server 130 or 150 and a corresponding database 131 or 151.

It is realized that all the aspects of the present invention described above are applicable, when possible, to said method, said system 100 and said computer software product, respectively.

In the following, various methods for initiating or registering a device 120, 122 with a central sever 130, 150 according to the invention are described. It is realized that, according to the invention the first two method steps of FIGS. 2 and 3 are always performed, and that the below described methods are performed in addition to these steps, preferably using the secure channel established using the code communicated from the device 120, 122 to the server 130, 150 via the SMS channel.

In a preferred method according to the present invention for registering a user for an authentication service that can be used subsequently to authenticate the user, the above described digitally coded image data is based upon an image selected by the user, and then automatically modified by the server before the user is allowed to enter credential information by selecting a series of pixel locations on the screen display of the electronic device. The selected pixel locations are stored on the central server, and when the user subsequently is authenticated, the same digitally stored image data is used to display the same image as originally displayed on the electronic device screen, and the user is allowed to again select a series of pixel locations, which are compared either to the firstly selected series of pixel locations or to coordinates determined by the server for each input field in the displayed image, based upon the dimensions of a virtual keyboard or the like being incorporated into the digitally stored image data by the central server.

It is preferred that the original image, once it has been modified to produce a modified version of the original image, is discarded, and is preferably not even stored anywhere on or accessible from the central server.

In particular, it is preferred that such a registration method comprises the following steps:

a) A user activates, such as by installing locally, a graphical user interface on the screen of the electronic device in the form of a mobile telephone comprising a SIM (Subscriber Identity Module) card.

b) The user provides, to the central server and preferably via the said graphical user interface, a telephone number of the mobile phone.

c) The central server causes an SMS (Short Message Service) to be sent to the mobile phone with a PIN code.

d) The graphical user interface is caused to, by the central server, display an image to the user, as described above, comprising image subparts being associated with pieces of information in the central server, and the user enters the PIN code by selecting the corresponding parts of the displayed image, where the selected pixel positions are sent to the central server in an SMS which is automatically produced and sent by the graphical user interface (that is, the software function described above), preferably using a native SMS application of the mobile phone. The received coordinates are then interpreted by the central server. Alternatively, the graphical user interface is in this step caused to simply allow the user to enter the PIN code, using a conventional numeric pad or the like, after which the PIN code is sent in the said SMS to the central server. Conventional encryption can be used in both cases regarding the coordinate information or the PIN code.

e) The PIN code is used as the password to initiate a process to perform a TLS-SRP (Transport Layer Security Secure Remote Password) procedure resulting in a TLS-SRP tunnel, using which further subsequent communication between the central server and the mobile phone is performed.

f) The user is requested, via the graphical user interface, to select an image, such as by taking a photograph with the mobile phone camera or selecting an image file.

g) The central server or the graphical user interface software is caused to modify the selected image, such as by adding to the image a randomized alpha layer with transparent pixels, making the resulting image unique; and to add a virtual keyboard, a pinpad or the like on top of the image, in the form of an added raster image comprising corresponding image subparts.

h) Allowing the user to select a new PIN code or password by selecting on-screen pixel locations, sending the selected locations to the central server, via the said TLS-RSP tunnel, and therein determining the corresponding data input and/or storing the selected pixel locations.

i) Storing, on the central server, the mobile phone number to the mobile phone as a user identifier, and the entered new PIN code or password as the corresponding password, for future authentication of the user.

j) At a subsequent point in time, causing the same modified image to be displayed to the user, and allowing the user to again select a series of pixel locations. Then, either the selected pixel locations are compared to the previously selected, stored, pixel locations, or the newly selected pixel locations are interpreted as corresponding image subparts the corresponding piece of information of which are compared to the user selected pieces of information.

Furthermore, in step j) above, for the authentication a new TLS-SRP tunnel is preferably set up, using the mobile phone number as the user name and a hash value of the user-selected and subsequently modified image as the password. Preferred hashing algorithms are PBKDF2 and SCRYPT, in a reasonable number of loops, where at least 100000 loops is preferred. Then, the user is allowed to select the pixel locations as described above, which then are interpreted, after communication over the said TLS-SRP tunnel, by the central server as authentication password.

In case the user-selected password is subsequently lost by the user, the user may be requested, by a suitable functionality in the graphical user interface, to re-enter the mobile phone number. Alternatively, the mobile number of the mobile phone on which the graphical user interface is displayed may automatically be extracted by the graphical user interface. Then, the mobile phone number is used as the user name, and a hash value of the modified image is used as the password, as described above, to again initiate a TLS-SRP tunnel. After verifying the existence of a user account associated with the mobile phone number on the central server, a new PIN code is sent to the mobile phone via an SMS, and the procedure is reiterated from step d) above, but where the image displayed in step d) is the same as the one selected by the user and modified by the central server and where step g) is not necessarily performed.

In case the mobile phone itself is lost or replaced, a similar procedure can be performed, for instance in connection to installing or activating the graphical user interface on the new or replacement mobile phone.

In case the user wishes to change the user-selected image, a TLS-SRP tunnel is set up using the currently active user-selected image as the password, as described above, after which, using the TLS-SRP tunnel, steps f)-h) above are performed. Then, the TLS-SRP tunnel is terminated. When the user later is to be authenticated using the new user-selected image, a new TLS-SRP tunnel is set up using the new user-selected image as password, again as described above. The new TLS-SRP tunnel may also be set up before step h) is performed for the new user-selected image.

In particular, the use of a hash value of the selected and modified image as input to the encrypted communication channel provides for very high security regarding the communication between the central server and the user. The use of the mobile phone number also adds to the security standard, while at the same time providing a convenient method for, in combination with the previously-selected and stored (on the central server) user-selected, modified, image, restoring lost user passwords and handling mobile phone replacements as described above.

Above, a number of preferred embodiments have been described. However, it is apparent to the skilled person that many modifications can be made to the described embodiments without departing from the basic idea of the invention.

For instance, the various techniques for providing additional security as discussed in relation to FIGS. 4 and 5, such as displaying an image at a random screen location, moving it around as time goes by or displaying the image as a rendered surface on a movable three-dimensional object, can be applied to the web page displaying technique as described in connection to FIG. 3, so that a web page image can be displayed at a random location, etc.

In general, the various embodiments described herein can be used in combination with one another when so is applicable.

Moreover, the present methods for providing sensitive information from an electronic device can be used in many situations. For instance, online authentication procedures can use such provision of for instance a PIN code for increased security; and physical points of sale can use such methods for the secure provision of credential information in relation to for instance a payment.

In addition to display the image, the screen display 410, 510 can be used in other ways. For instance, an certain area of the screen display 410, 510 which is not used for displaying the image 420, 520 can be reserved to act as a "cancel" function control, so that when the user 110 selects a point within the said certain area, the central server 150 interprets such selection as a command to cancel the current input and restart the method, allowing the user 110 to make another input, possibly using a different image 420, 520.

Hence, the present invention is not to be considered limited to the described embodiments, but is variable within the scope of the enclosed claims.

The invention claimed is:

1. Method for providing information to a central server using an electronic device that has a screen display and a Subscriber Identity Module (SIM) card, wherein the method comprises:
   an initial registration step, including the electronic device sending a Short Message Service (SMS) comprising a code that was previously provided to the electronic device or a value calculated from the code to a predetermined SMS recipient,
   the central server receiving the code or value comprised in said SMS and, in response, authenticating the electronic device, the authenticating including setting up a secure communication channel between the electronic device and the central server based upon said code,
   the electronic device creating or selecting digitally coded image data and communicating to the central server image display information useable by the central server to interpret screen coordinates corresponding to user selection on the screen display relative to a displayed image based on the image data, and
   in a later performed information providing step performed at least partly via the said secure communications channel, the steps:
a) displaying on said screen display the image based on said image data to the user;
b) receiving user input corresponding to a user selected specific part of the displayed image;
c) providing to the central server from the electronic device, over said secure communication channel, a coordinate position representing the location for the specific part on the screen display;
d) in the central server, identifying, based on the image display information, one subpart of said displayed image, among a set of several different such subparts, corresponding to the coordinate position; and
e) translating the identified subpart into a piece of information corresponding to the identified subpart based upon a set of associations between the subparts and respective pieces of information.

2. Method according to claim 1, wherein no information regarding what image subpart corresponds to what piece of information is provided to the electronic device.

3. Method according to claim 2, wherein each subpart in the said set of subparts corresponds to a respective piece of information.

4. Method according to claim 3, wherein steps c)-e) are performed several times, so that the respective pieces of information are included in a series of pieces of information that is provided from the electronic device to the central server, and in that said series constitutes the information.

5. Method according to claim 1, wherein, in step b), the image is displayed so that its extension across the screen display is defined by a specific set of pixel coordinate information, which coordinate information is used by the central server in the translating in step e.

6. Method according to claim 1, wherein the piece of information is authentication information entered by a user via the electronic device.

7. Method according to claim 1, wherein the screen display is a touchscreen, and that the selection in step c) takes place by the user pointing to a certain point on the screen display.

8. Method according to claim 1, wherein, in step b), the image is displayed as a two-dimensional image on the screen display.

9. Method according to claim 8, wherein the image is displayed so that it covers the whole screen display.

10. Method according to claim 8, wherein the image is displayed so that it covers the whole screen display apart from a part of the screen display being used as a cancel user control.

11. Method according to claim 1, wherein, in step b), the image is displayed as a two-dimensional surface of a three-dimensional structure, and a projection of the three-dimensional structure is shown on the screen display.

12. Method according to claim 11, wherein, in step c), an interactive, graphical user interface executing on the electronic device is caused to allow the user to select the said specific part of the image, in that the user interface is further caused to allow the user to manipulate the said three-dimensional structure so as to modify the position on the screen display of the said image before selecting said specific part, and in that, in step d), information regarding the said manipulations are provided, together with the coordinate data, to the central server.

13. Method according to claim 1, wherein, in step b), the displayed image is variable, in that the image is either caused to automatically change over time or that an interactive graphical user interface software function executed on or from the electronic device is caused to allow the user to set the value of a progress parameter to a specific value before selecting the specific part of the image, and in that the time or progress parameter in step d) is provided to the central server together with the coordinate data.

14. System for a user to provide information using an electronic device that has a screen display and a Subscriber Identity Module (SIM) card, which system comprises a central server, wherein the central server is arranged to:
   in an initial registration step, receive a Short Message Service (SMS) message comprising a code or a value calculated from the code from the electronic device and, in response, authenticate the electronic device, the authentication including setting up a secure communication channel is set up between the electronic device and the central server based upon said code, receive image display information regarding digitally coded image data existing in the electronic device for which a corresponding image is displayable at the electronic device, the image display information useable by the central server to interpret screen coordinates corresponding to user selection on the screen display relative to a displayed image based on the image data, and the image comprising a set of image subparts that are each associated at the central server with a respective particular piece of information, in a subsequent information providing step performed at least partly via the secure communications channel:

receive, over said secure communication channel and from the electronic device, a coordinate position representing the location on the screen display for a user-selected specific part of the displayed image, as a reaction to the reception of said coordinate position, and based on the image display information, identify one of said subparts of said displayed image corresponding to the received coordinate position, and translate the identified subpart into the piece of information corresponding to the identified subpart.

15. An electronic device comprising a screen display and a Subscriber Identity Module (SIM) card, the electronic device is arranged to:

provide an interactive graphical user interface to a user of the device, in an initial registration step, send a previously received code or a value calculated from the code, in a Short Message Service (SMS), to a predetermined SMS recipient, based upon said code, set up a secure communication channel between the electronic device and a central server, create or select digitally coded image data and send, to the central server, image display information useable by the central server to interpret screen coordinates corresponding to user selection on the screen display relative to a displayed image based on the image data, in a subsequent information providing step:

received user input corresponding to a user selected specific part of the displayed image corresponding to the image data; and communicate with the central server via said secure communication channel and provide to the central server a coordinate position representing the location for the specific part on the screen display.

* * * * *